US007218085B2

(12) United States Patent
Abedinpour et al.

(10) Patent No.: US 7,218,085 B2
(45) Date of Patent: May 15, 2007

(54) INTEGRATED ZVS SYNCHRONOUS BUCK DC-DC CONVERTER WITH ADAPTIVE CONTROL

(75) Inventors: Siamak Abedinpour, Scottsdale, AZ (US); Sayfe Kiaei, Fountain Hills, AZ (US)

(73) Assignee: Arizona Board of Regents, Tempe, AZ (US)

( * ) Notice: Subject to any disclaimer, the term of this patent is extended or adjusted under 35 U.S.C. 154(b) by 0 days.

(21) Appl. No.: 10/515,703

(22) PCT Filed: May 27, 2003

(86) PCT No.: PCT/US03/17071

§ 371 (c)(1),
(2), (4) Date: Dec. 15, 2005

(87) PCT Pub. No.: WO03/100831

PCT Pub. Date: Dec. 4, 2003

(65) Prior Publication Data

US 2006/0091871 A1    May 4, 2006

Related U.S. Application Data

(60) Provisional application No. 60/383,345, filed on May 24, 2002, provisional application No. 60/383,375, filed on May 24, 2002, provisional application No. 60/383,382, filed on May 24, 2002.

(51) Int. Cl.
*G05F 1/618* (2006.01)
*G05F 1/62* (2006.01)
(52) U.S. Cl. ..................... 323/282; 323/224; 323/284

(58) Field of Classification Search ............... 323/224, 323/225, 272, 282, 223, 351, 222, 271, 283, 323/284, 285
See application file for complete search history.

(56) References Cited

U.S. PATENT DOCUMENTS 5,066,900 A * 11/1991 Bassett ................. 323/224
5,629,542 A    5/1997 Sakamoto et al.

(Continued)

OTHER PUBLICATIONS

S. Abedinpour, et al., (2000), Conference Record of the 2000 IEEE Industry Application Converence: Thirty-Fifth IAS Annual Meeting and World Conference on Industrial Application of Electrical Energy, "DC-DC Power Converter for Monolithic Implementation", vol. 4 of 5, pp. 2471-2475.

(Continued)

*Primary Examiner*—Gary L Laxton
(74) *Attorney, Agent, or Firm*—McDonnell Boehnen Hulbert & Berghoff LLP

(57) ABSTRACT

DC-DC converters are disclosed that can be integrated onto a semiconductor device. In one embodiment, the invention includes a first MOSFET and a second MOSFET, where the drain of the first MOSFET forms a common node with the drain of the second MOSFET. In addition, a controller is connected to the gates of each of the MOSFETS and a passive filter is connected between the common node and ground. A load is also connected between the common node and ground and feedback circuitry is connected between the common node and the controller.

13 Claims, 7 Drawing Sheets

U.S. PATENT DOCUMENTS

| | | | | |
|---|---|---|---|---|
| 5,959,439 | A | * | 9/1999 | Shenai et al. ............... 323/222 |
| 5,973,367 | A | | 10/1999 | Williams |
| 6,281,666 | B1 | * | 8/2001 | Tressler et al. ............ 323/272 |
| 6,304,066 | B1 | * | 10/2001 | Wilcox et al. .............. 323/282 |
| 6,429,632 | B1 | * | 8/2002 | Forbes et al. ............... 323/282 |
| 6,552,517 | B1 | * | 4/2003 | Ribellino et al. ........... 323/282 |

OTHER PUBLICATIONS

W. Lau, et al., (1997), 28th Annual IEEE Power Electronics Specialists Conference, "An Integrated Controller for a High Frequency Buck Converter", vol. 1, pp. 246-254.

A. Stratakos, et al., (1994), 25th annual IEEE Power Electronics Specialists Conference, "A Low-Voltage CMOS DC-DC Converter for a Portable Battery-Operated System", vol. 1, Jun. 20-25, pp. 619-626.

D. Maksimovic, et al., (1999), 30th Annual IEEE Power Electronics Specialists Conference, "Switched-Capacitor DC-DC Converters for Low-Power On-Chip Applications", vol. 1, pp. 54-59.

B. Acker, et al., (1995), IEEE Power Electronics Specialists Conference in Atlanta Georgia, "Synchronous Rectification with Adaptive Timing Control", pp. 88-95.

* cited by examiner

INTEGRATED ZVS SYNCHRONOUS BUCK DC-DC CONVERTER WITH ADAPTIVE CONTROL

CROSS-REFERENCE TO RELATED APPLICATION

This application claims the benefit of U.S. Provisional Patent Application Nos. 60/383,345, filed May 24, 2002; Ser. No. 60/383,375, filed May 24, 2002; and Ser. No. 60/383,382, filed May 24, 2002.

BACKGROUND OF THE INVENTION

The present invention relates generally to power electronics and more specifically to DC-DC converters.

In many electronics applications, various blocks of components on the integrated circuit may have optimal power consumption at different operational voltages. In mobile applications, minimizing power consumption can require that a single battery supply a number of different voltage levels. One method of converting a voltage supplied by a battery to another voltage is to use a DC-DC converter.

SUMMARY OF THE INVENTION

DC-DC converters in accordance with the present invention are disclosed that use feedback control to ensure zero voltage switching ("ZVS") and that can be integrated onto a semiconductor device. In one embodiment, the invention includes a first MOSFET and a second MOSFET, where the drain of the first MOSFET forms a common node with the drain of the second MOSFET. In addition, a controller is connected to the gates of each of the MOSFETS and a passive filter is connected between the common node and ground. A load is also connected between the common node and ground and feedback circuitry is connected between the common node and the controller.

A further embodiment includes at least two stages, where each stage includes a first MOSFET and a second MOSFET where the drain of the first MOSFET forms a common node with the drain of the second MOSFET. In addition each stage includes a controller connected to the gates of each of the MOSFETs, a passive filter that is connected between the common node and ground, a load connected between the common node and ground and feedback circuitry connected between the common node and the controller. The feedback circuitry in at least one of the stages includes a delay.

Another embodiment includes a DC-DC converter including at least one capacitor and at least one inductor integrated onto a semiconductor device and having an output and a load connected to the output of the DC-DC converter.

DETAILED DESCRIPTION OF THE INVENTION

Embodiments of the present invention include a DC-DC converter that has n stages with approximately 360°/n phase shift between adjacent stages. In several embodiments, each stage has an adaptive controller that adjusts the dead-time between the gate triggering pulses of the power MOSFETs in each stage to ensure ZVS operation over a wide range of load variation. In addition, embodiments of the present invention can switch at very high frequencies enabling the use of passive components that can be incorporated onto an integrated circuit ("IC").

Figure 1:
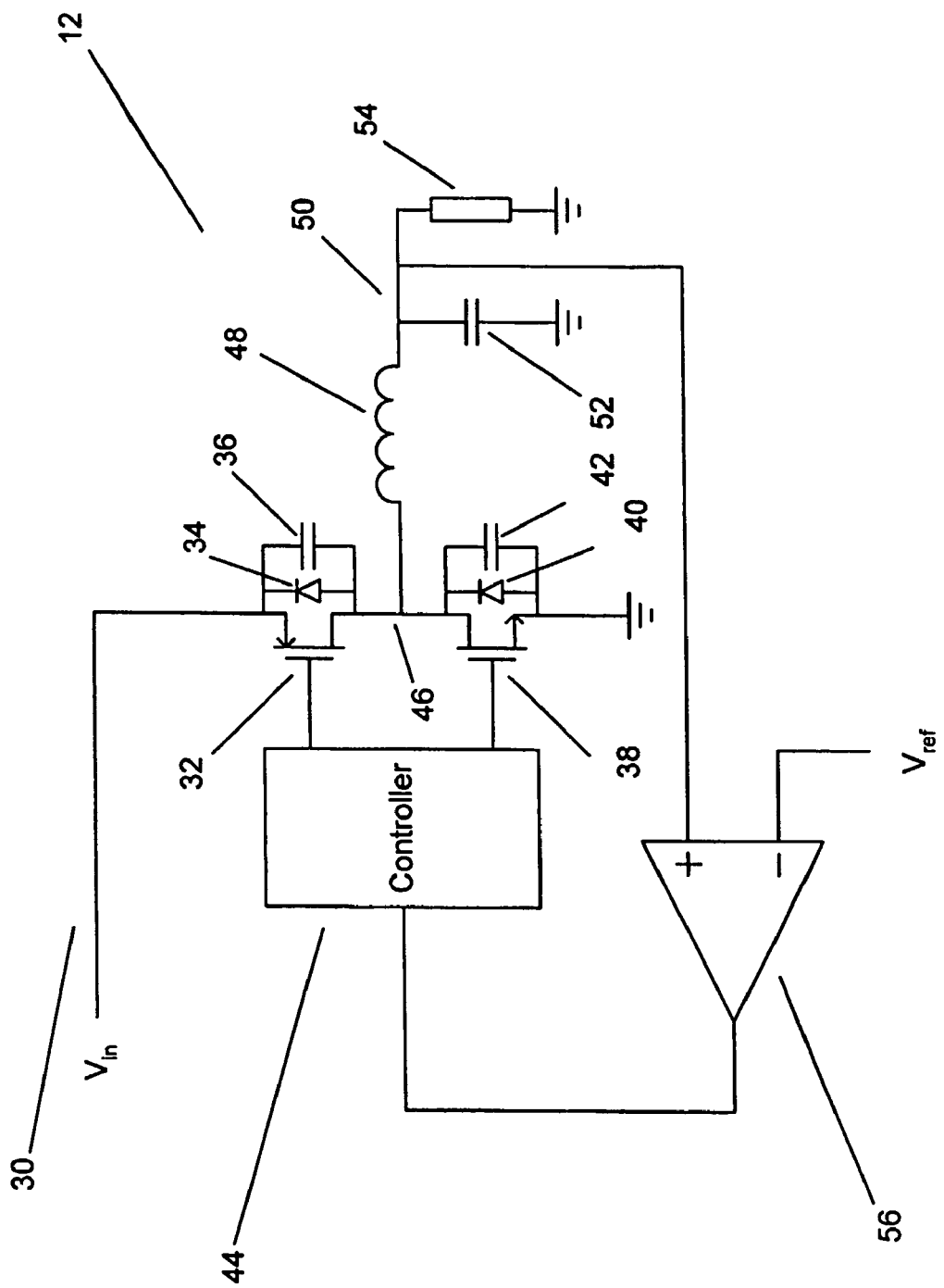
FIG. 1 shows a schematic diagram of an n stage DC-DC converter in accordance with the present invention.

Turning now to the drawings, a DC-DC converter 12 in accordance with the present invention is illustrated in FIG. 1. The DC-DC converter 12 includes an input 30 that is connected to the source of a n-channel MOSFET 32. A battery (not shown) would typically be connected to the input 30 to supply current to the DC-DC converter. Intrinsic to the MOSFET is a body diode and an output capacitance and these are represented as a diode 34 and a capacitor 36 connected across the drain and source of the n-channel MOSFET. The drain of a p-channel MOSFET 38 is connected to the drain of the n-channel MOSFET 32. The body diode and the output capacitance of the n-channel MOSFET are represented as a diode 40 and a capacitor 42 connected across the drain and the source of the p-channel MOSFET. The gates of both the n-channel MOSFET and the p-channel MOSFET are connected to a controller 44. The common node 46 formed where the drains of the MOSFETS connect is also connected to one end of an inductor 48. The other end of the inductor forms a second common node 50. A capacitor 52 and the load 54 are connected between this node 50 and ground. The node 50 also provides an input to a comparator 56. A second input to the comparator is provided by a reference voltage and the output of the comparator is provided as an input to the controller.

The circuit illustrated in FIG. 1 can be used to generate a constant output voltage to the load. The n-channel MOSFET conserves power by mainly operating in the cut-off or linear operation modes. When in the linear operation mode, current flows through the n-channel MOSFET and causes energy to accumulate in the inductor 48. The n-channel MOSFET can then be turned to cut-off mode. Once the p-channel MOSFET is in cut off mode, the energy stored in the inductor can cause current to flow through the p-channel MOSFET provided that the n-channel MOSFET is in linear operation mode. The controller can provide inputs to the gates of the MOSFETs, which ensure that the switching of the MOSFETs from linear operation mode to cut-off mode is synchronized. By varying the switching frequency and the pulse width of the signals provided to the gates of the n-channel and p-channel MOSFETs, the controller is able to control the voltage level provided to the load. In circumstances where load conditions vary, the use of feedback to the controller via the comparator can enable the controller to maintain a predetermined voltage across the load.

In several embodiments, the efficiency of the DC-DC converter is increased by using zero voltage switching ("ZVS"). ZVS involves coordinating the switching of the MOSFETs so that the voltage drop across the drain and the source of the MOSFET is approximately zero volts during switching. This zero volt condition reduces power loss as the MOSFET as it switches from linear operation mode to cut-off mode or vice versa. The switching of the MOSFETs is controlled by the controller. The controller can achieve ZVS by first switching the n-channel MOSFET from linear operation to cut-off and then delaying the switching of the p-channel MOSFET from cut-off to linear operation until the voltage at the node 46 is zero volts. A delay is required, because energy stored in the inductor takes time to charge or discharge the output capacitance of the MOSFETs. Therefore, the switching of the n-channel MOSFET must be delayed to allow current to flow to or from its output capacitor 36 and the voltage at the node 46 to fall to zero volts. Similarly, the n-channel MOSFET can turn on under ZVS conditions when the output capacitor 42 of the p-channel MOSFET is charged to $V_{in}$. The time required for the energy stored in the inductor to dissipate depends upon the impedance of the load. If the load impedance varies, then the switching delay must also vary to preserve ZVS conditions. In one embodiment of the present invention, a feedback signal based upon the voltage across the load is used to adjust the switching delay introduced by the controller. In other embodiments other signals indicative of variations in the load impedance can be used to modify the switching delay between the n-channel MOSFET and the p-channel MOSFET.

Figure 2:
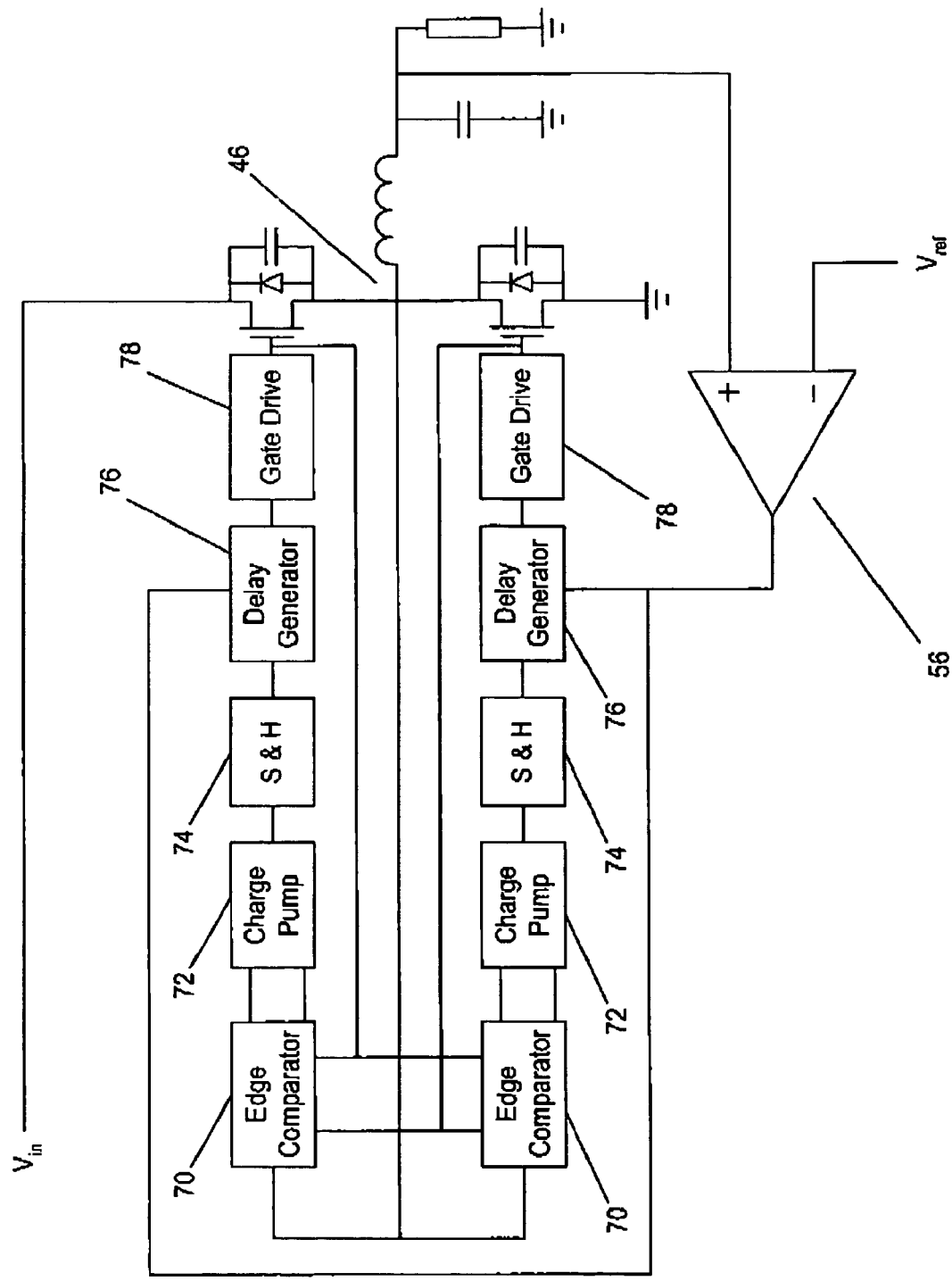
FIG. 2 shows a single stage of a DC-DC converter in accordance with the present invention.

An embodiment of a DC-DC converter 12 including a controller 44 in accordance with the present invention is shown in FIG. 2. The controller includes two groups of similar components connected to the gates of each of the MOSFETs and the output of the comparator 56. Each group of components includes an edge comparator 70 connected to the gate of each of the MOSFETs, to the common node 46 and to a charge pump 72. The charge pump is also connected to a sample and hold circuit 74, which is in turn connected to a delay generator 76. The delay generator is also connected to the output of the comparator 56 and to a drive circuit 78. The drive circuit is connected to the gate of one of the MOSFETs.

The drive circuit 78 is configured to provide input signals to the gate of a MOSFET that can drive the MOSFET into linear operation mode or into cut-off mode. The drive circuit 78 is controlled by the other components in the controller, which are configured to obtain ZVS conditions by introducing a switching delay in the manner described above. In one embodiment, the drive circuit is controlled by using the edge comparator to detect a switch in the gate voltage of the MOSFET, which is in linear operation mode. This switch causes the edge comparator to send a signal to the charge pump associated with the cut-off MOSFET. The sample and hold circuitry connected to this charge pump, then holds the voltage level generated by the charge pump. However, this voltage level is not immediately used to drive the gate drive circuitry. Instead the delay generator introduces a delay in the propagation of the output from the sample and hold circuitry to the input of the gate drive. The magnitude of the delay is dependent on the output of the comparator 56, which is configured to provide a signal indicative of variations in the load impedance. In one embodiment, the magnitude of the delay is sufficient to ensure that the voltage across the source and the drain of the MOSFET is as close as possible to zero volts at the time the MOSFET switches. The closer the voltage across the source and the drain of the MOSFET is to the ZVS condition, the less power that is consumed by the DC-DC converter.

Figure 3:
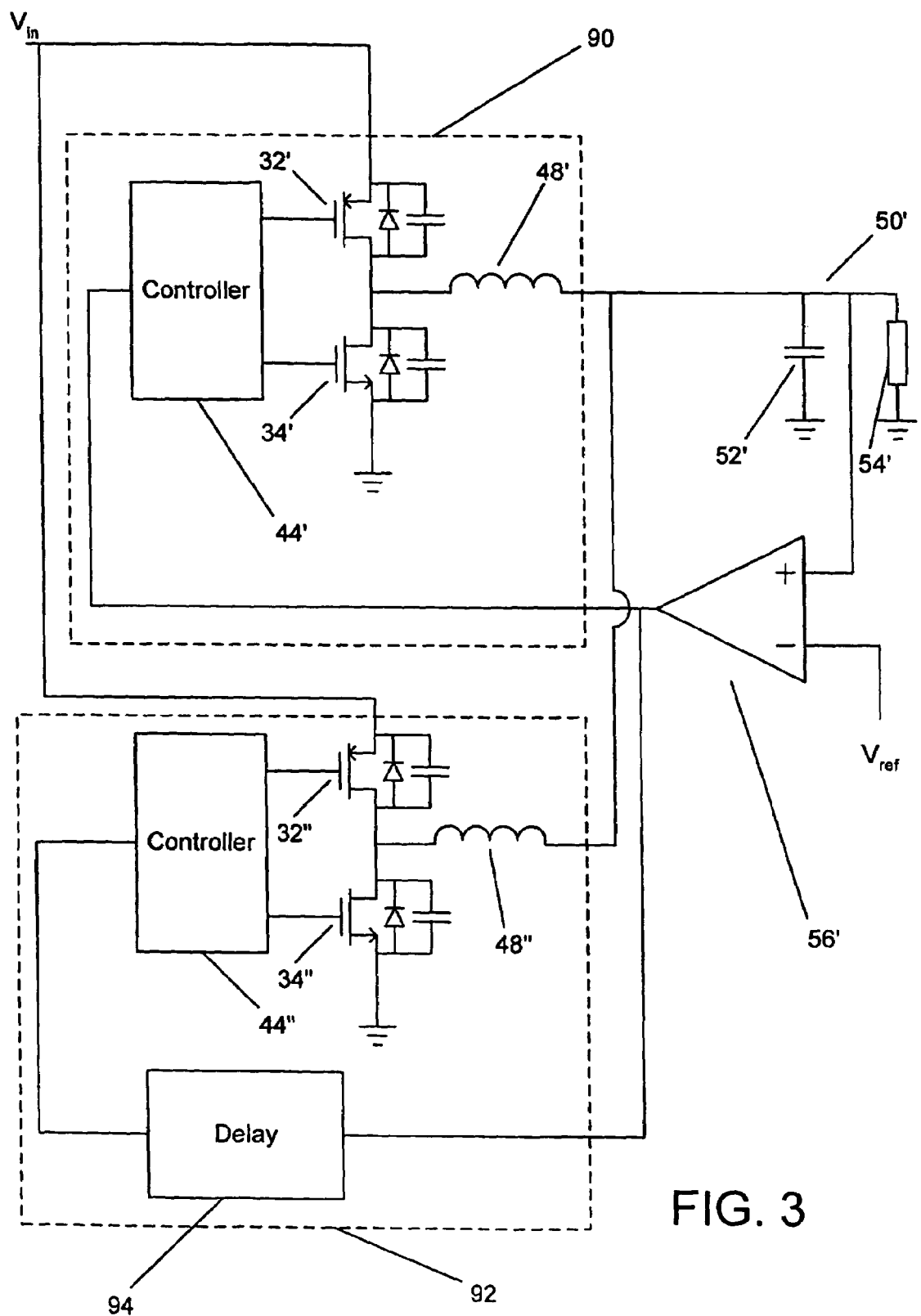
FIG. 3 shows an implementation for a controller of a single stage of a DC-DC converter in accordance with the present invention.

The DC-DC converter illustrated in FIGS. 1–3 generates an output at the node 46 that has a ripple dependent upon the switching of the p-channel and n-channel MOSFETS. When the current required by a load increases the magnitude of the ripple increases and larger inductors and capacitors are required to smooth the ripples and provide a smooth DC voltage. Instead of increasing the inductance and/or capacitance of the passive elements used in the output filter, a multiple stage DC-DC converter in accordance with the present invention can be used to decrease the amplitude of the ripple and increase the ripple frequency. Both a decrease in the amplitude and an increase in the ripple frequency enable the DC-DC converter to be constructed using smaller inductors and capacitors.

An embodiment of a DC-DC converter having two stages is illustrated in FIG. 3. The first stage 90 is implemented in a manner similar to the stage illustrated in FIG. 1. The second stage 92 is also implemented in a manner similar to the stage illustrated in FIG. 1 with the exception that a delay stage 94 is introduced between the output of the comparator 56' and the input of the controller 44". The delay is introduced to ensure that each stage of the DC-DC converter operates in a manner that provides DC current to the load and that any ripple in the output of the DC-DC converter is of sufficiently low frequency to be filtered by the capacitor 52'.

Figure 4:
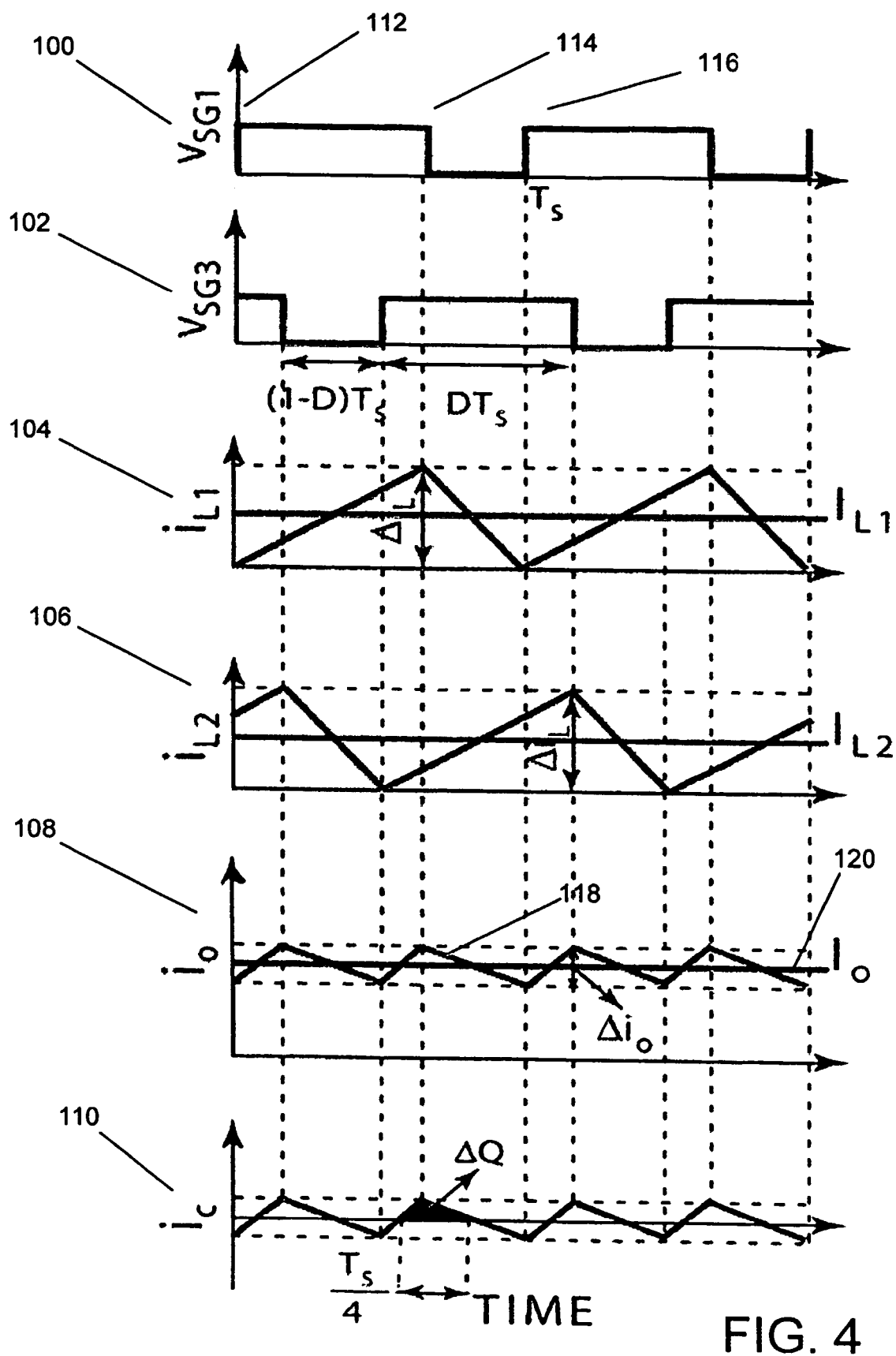
FIG. 4 shows a two stage DC-DC converter in accordance with the present invention.

A series of graphs showing voltages and currents at various points in the circuit shown in FIG. 3 are illustrated in FIG. 4. The first graph 100 shows the voltage provided to the gate of the MOSFET 32' by the controller 44'. The second graph 102 shows the voltage provided to the gate of the MOSFET 32" by the controller 44". The third graph 104 shows the current through the inductor 48'. The fourth graph 106 illustrates the current through the inductor 48". The fifth graph 108 shows the current that is provided by the two stages to the common node 50' to which the capacitor 52' and the load 54' are connected and the sixth graph 110 shows the current through the capacitor 52'. Each of the graphs illustrates current or voltage in the y-axis and time on the x-axis. Each graph uses the same time scale on the x-axis so that the graphs can provide an impression of the currents and voltages in various locations within the circuit at a given instant of time.

The graphs show that the controller 44' can provide signals to the MOSFET 32' such that the MOSFET 32' is initially in linear operation mode at the point 112 and then the MOSFET 32' is in cut-off mode at the point 114. The MOSFET 32' then remains cut-off mode for a period of time and then is switched back into linear operation mode at the point 116. The period of time between the point 112 and the point 116 is $T_s$. The controller 44' can be configured to ensure that both the switching period $T_s$ and the amount of delay between the points 114 and 116 can vary in response to feedback from the comparator 56' to ensure ZVS. The current through the inductor 48' (shown in the third graph 104) increases between the points 112 and 114 while the MOSFET 32' is in linear operation mode and decreases between the points 114 and 116 when the MOSFET 32' is in cut-off mode.

The controller 44" operates in a similar manner to the controller 44', except that the signals generated by the controller 44" are offset by a time delay relative to the signals generated by the controller 44'. The time delay is introduced by the delay stage 94. The delay introduced by the time delay stage is fixed as a proportion of $T_s$ and, therefore, varies in response to variations in $T_s$.

The effect of the time delay between the switching of the MOSFETs 32' and 32" can be seen in the fifth graph 108. The fifth graph 108 shows that the current provided to the node 50' by the DC-DC converter is the sum of the currents through the inductors 48' and 48" (see graphs 3 and 4 of FIG. 6). The current waveform 118 shown in the fifth graph 108 is an asymmetric triangular waveform that includes a DC offset. The DC offset level is shown by the line 120. The triangular wave component is attenuated by the capacitor 52' that is connected in parallel with the load 54' and thus a smoothed DC current is provided the load 54'. The higher the frequency of the ripple the greater the attenuation achieved by the capacitor 52' or, alternatively, the smaller the capacitance of the capacitor that can be used to achieve a desired amount of attenuation.

Figure 5:
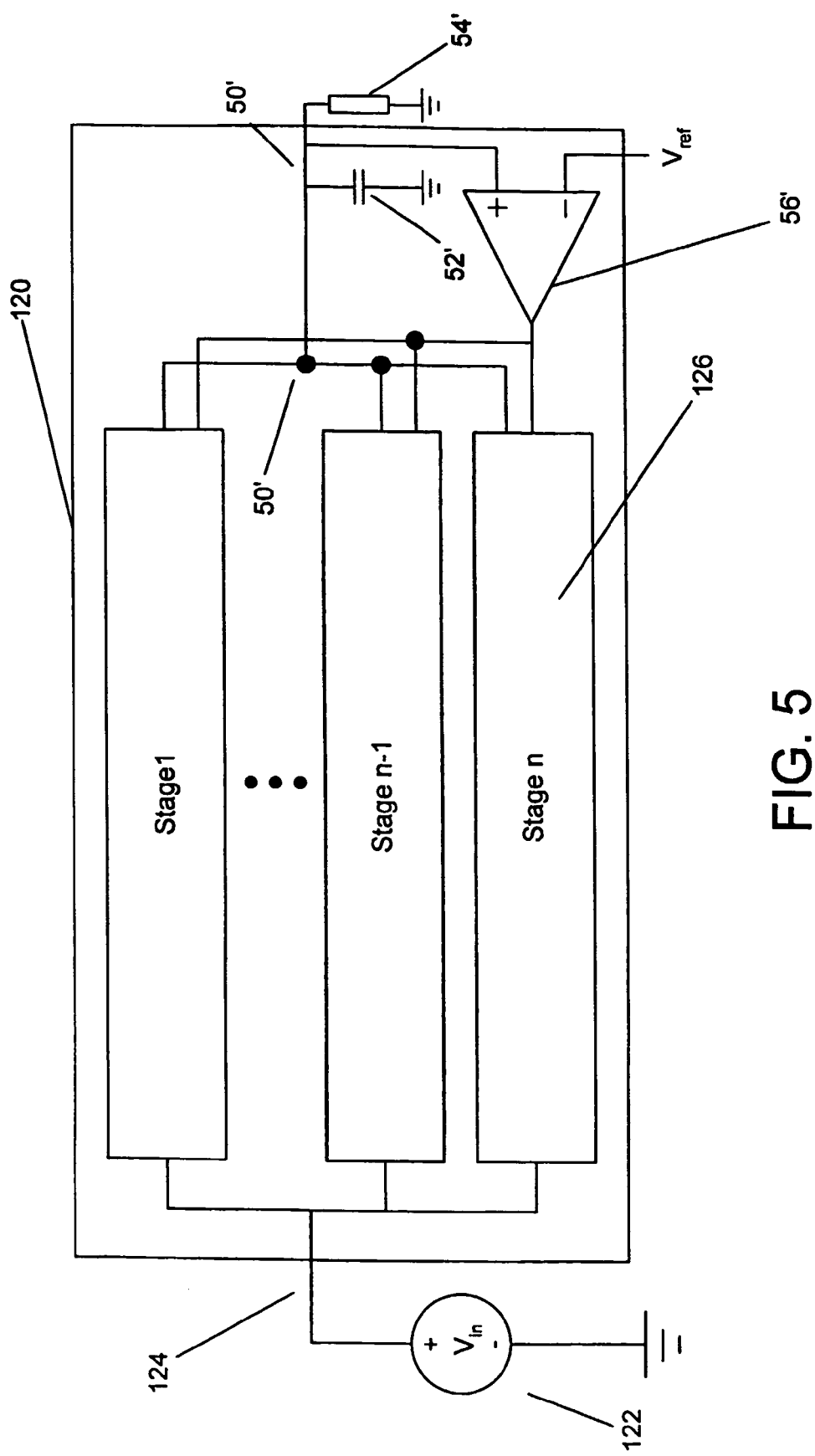
FIG. 5 shows six graphs illustrating various voltages and currents during the operation of the circuit illustrated in FIG. 4 in accordance with the present invention.

The magnitude of the ripple in the current provided to the output filter can be further reduced and the frequency of the ripple further increased by constructing a DC-DC converter having more than 2 stages. An n stage DC-DC converter 120 is illustrated in FIG. 5. A battery 122 provides an input 124 to the DC-DC converter. The battery input is connected to an input of each the interleaved stages 126 and each of the interleaved stages has an output that is connected to a common node 50'. A capacitor 52' and a load 54' are connected between the common node 50' and ground. A comparator is also connected to the common node 50' and provides feedback to each of the stages 126. Each of the n interleaved stages 126 of the DC-DC converter can be constructed in a similar manner to the stage 92 illustrated in FIG. 3, with the exception that the delay introduced by the delay stage 94 is different in each stage.

Figure 6:
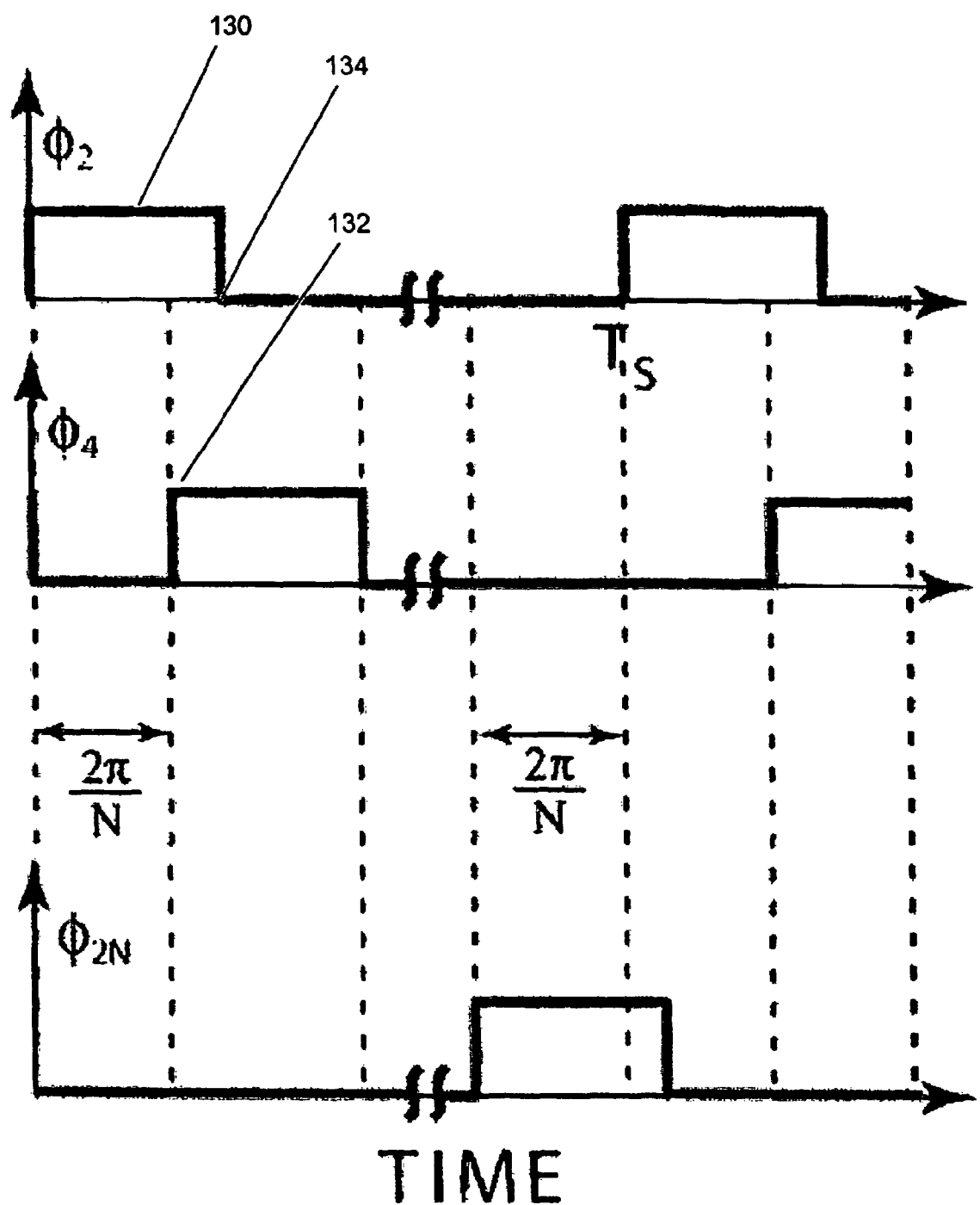
FIG. 6 shows a number of graphs illustrating the operation of an n stage DC-DC converter in accordance with the present invention.

A timing diagram showing control signals provided to the MOSFET in each of the n stages that is equivalent to the MOSFET 32" in the stage 92 shown in FIG. 3 is illustrated in FIG. 6. In each case the period in which the MOSFET is in linear operation mode overlaps with periods in which MOSFETs of other stages are also in linear operation mode. At a point 130, only one MOSFET is in linear operation mode and all other MOSFETs are in cut-off mode. At the point 132 a second MOSFET switches from cut-off to linear operation mode and at a point 134 the first MOSFET switches from linear operation mode to cut-off mode. In this way each MOSFET is switched to linear operation mode for a period of time during every cycle and the period in which a specific MOSFET is in linear operation mode will overlap with the MOSFET that was switched to linear operation mode immediately before the specific MOSFET and the MOSFET that was switched to linear operation mode immediately after the specific MOSFET.

As mentioned above, increasing the switching frequency of the MOSFETs and using multiple stages can enable the reduction of the capacitances and inductances of the capacitors and inductors that are used in the construction of a DC-DC converter in accordance with the present invention. When the required inductance and capacitance falls below levels dictated by the state of the art of semiconductor manufacturing, the construction of a DC-DC converter using semiconductor fabrication techniques becomes feasible. The ability to integrate an entire DC-DC converter or multiple DC-DC converters onto a semiconductor device can reduce parasitics and power loss and improve the transient response of the DC-DC converter to variations in load or input voltage that often result when discreet components are connected using wiring or circuit traces.

Figure 7:
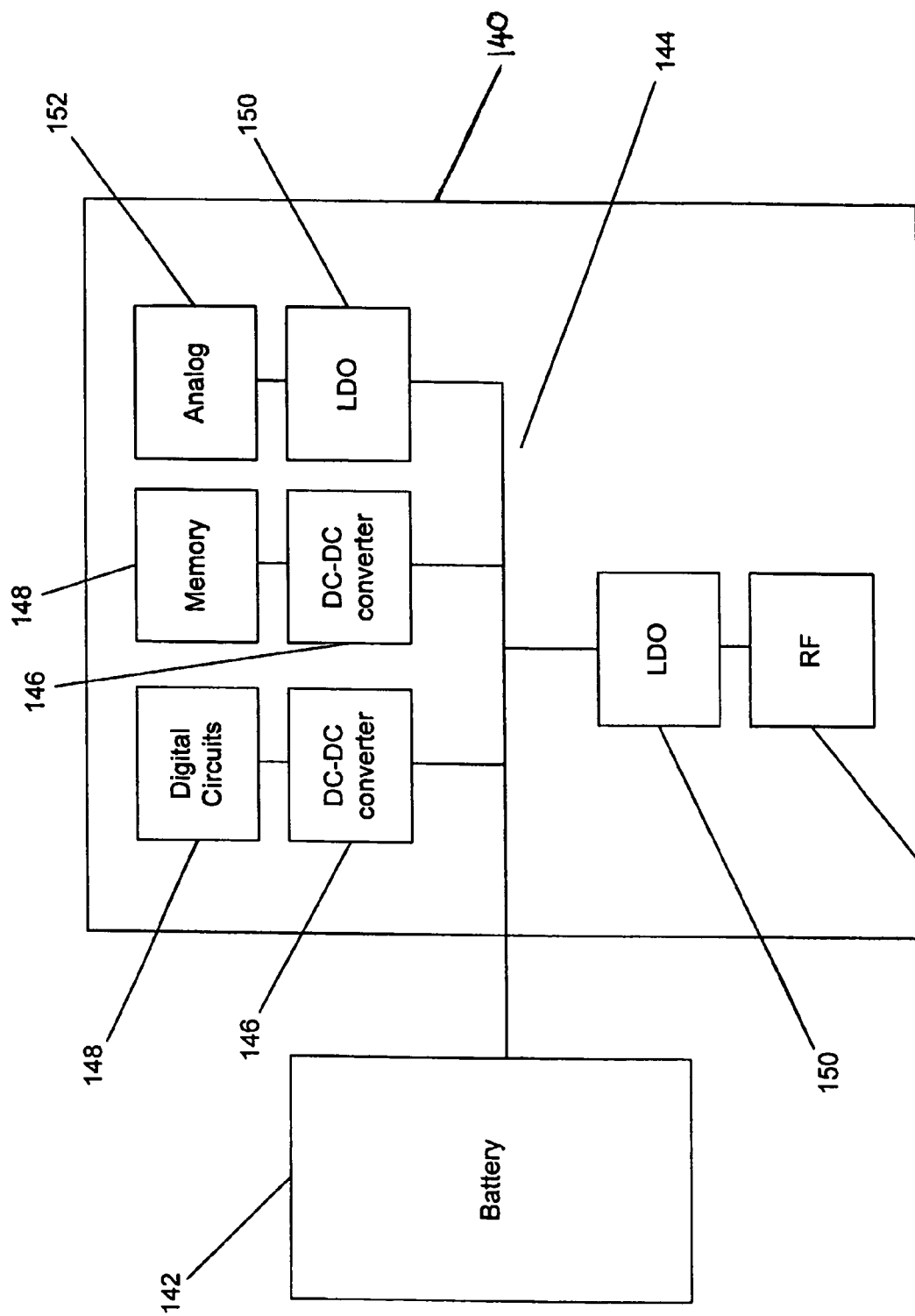
FIG. 7 shows a semiconductor device including a DC-DC converter and a load circuit in accordance with the present invention.

A power distribution system incorporating embodiments of integrated DC-DC converters in accordance with the present invention is illustrated in FIG. 7. The power distribution system is integrated onto a semiconductor device 140 that is connected to a battery 142 via a power bus 144. Connected to the battery are a variety of power converters including DC-DC converters 146 in accordance with the present invention to provide a variety of DC currents to loads 148 that can also be integrated onto the device. In addition, other power converters that convert DC currents to analog currents are connected to the power bus. Linear drop-out regulators ("LDO") 150 are also used to provide DC voltages to sensitive loads 152 such as RF and analog loads. In other embodiments, other power supplies such as switch capacitor DC-DC converters ("charge pumps") or other power supplies can also be used where appropriate.

In one embodiment, the inductor and the capacitor used in the construction of a DC-DC converter integrated onto a semiconductor device constructed to provide a 150 mA current to a load included a capacitance in the range of 10–20 nH and 2–3 nF, respectively. The DC-DC converter was constructed using two stages and operated at switching speed that varied according to variations in the load around 100 MHz. The values of the capacitors, inductors and switching frequencies used in a DC-DC converter in accordance with the present invention are dependent upon the load. When the load is increased, the size of the inductor and/or capacitor must increase as must the switching frequency. As discussed above, increasing the number of stages can reduce the need to increase the size of the inductor and/or the capacitor. In one embodiment, the switching speed is in excess of 15 MHz. In other embodiments, the switching speed is in excess of 50 MHz. In further embodiments, the switching speed is in excess of 100 MHz.

Often switching speeds are increased to reduce the size of passive elements to a point where they can be integrated. The use of high switching speeds can require extremely fast feedback responses in order to maintain ZVS. In the illustrated embodiments hysteresis control is used. Other control techniques could be used in the implementation of embodiments of the DC-DC converter, however, the speed of the control circuitry or devices must be sufficient to reduce power loss during MOSFET switching.

While the above description contains many specific embodiments of the invention, these should not be construed as limitations on the scope of the invention, but rather as an example of one embodiment thereof. Many other variations are possible. Accordingly, the scope of the invention should be determined not by the embodiments illustrated, but by the appended claims and their equivalents.

What is claimed is:

1. A DC-DC converter, comprising:
   a first MOSFET;
   a second MOSFET wherein a connection between the first MOSFET and the second MOSFET forms a first common node;
   a first controller connected to the gates of each of the MOSFETS;
   a first passive filter connected between the first common node and ground;
   a load connected between the first common node and ground;
   a first feedback circuit connected between the first common node and the first controller; and
   wherein the first controller comprises:
      a level detector connected to the first feedback circuit, the gates of the first and second MOSFETS and having an output;
      a charge pump having an input connected to the output of the level detector and having an output;

a sample and hold circuit having an input connected to the output of the charge pump and having an output;

a delay circuit having an input connected to the output of the sample and hold circuit and having an output; and a gate drive having an input connected to the output of the delay circuit and having an output connected to the gate of either the first or second MOSFET.

2. The DC-DC converter of claim 1 wherein the first controller is configured to independently switch the first MOSFET end the second MOSFET at frequencies in excess of 15 MHz.

3. The DC-DC converter of claim 1, wherein the first controller is configured to independently switch the first MOSFET and the second MOSFET at frequencies in excess of 50 MHz.

4. The DC-DC converter of claim 1, wherein the first controller is configured to independently switch the first MOSFET and the second MOSFET at frequencies in excess 100 MHz.

5. The DC-DC converter of claim 1, wherein the first feedback circuit and the first controller are configured to provide hysteresis control.

6. The DC-DC converter of claim 1, wherein:

the first feedback circuit includes a comparator with a first input connected to a common node and a second input connected to a reference signal; and the output of the comparator is provided as an input to the first controller.

7. The DC-DC converter of claim 1, wherein the first controller and the comparator are configured to vary the time at which each of the MOSFETs are switched based on variations in the impedance of the load.

8. The DC-DC converter of claim 1, further comprising first and second stages, wherein the second stage comprises:

a third MOSFET;

a fourth MOSFET wherein a connection between the third MOSFET and the fourth MOSFET forms a second common node;

a second controller connected to the gates of each of the third and fourth MOSFETs;

a second feedback circuit connected between the second common node and the second controller and wherein the second feedback circuit includes a delay stage.

9. The DC-DC converter of claim 8, wherein the first and second controllers and the first and second feedback circuits are configured to provide zero voltage switching and to provide a signal to the first common node having a predetermined frequency of ripple.

10. A semiconductor device, comprising the DC-DC converter of claim 1.

11. The semiconductor device of claim 10, further comprising at least one capacitor and at least one inductor integrated onto the semiconductor device.

12. The semiconductor device of claim 11, further comprising:

a power bus connected to the DC-DC converter; and a second converter connected to the power bus.

13. The semiconductor device of claim 12, wherein the second converter is a DC-DC converter.

* * * * *